United States Patent [19]

Lagen et al.

[11] Patent Number: 5,076,103
[45] Date of Patent: Dec. 31, 1991

[54] WATER COOLED STATIC PRESSURE PROBE

[75] Inventors: Nicholas T. Lagen, Hampton; Garland D. Reece, Poquoson; John W. Eves, Newport News; Steve L. Geissinger, Poquoson, all of Va.

[73] Assignee: The United States of America as represented by the Administrator of the National Aeronautics and Space Administration, Washington, D.C.

[21] Appl. No.: 575,695

[22] Filed: Aug. 31, 1990

[51] Int. Cl.$^5$ .............................................. G01L 19/04
[52] U.S. Cl. ........................................ 73/708; 73/147; 73/182
[58] Field of Search .................... 73/708, 178 R, 182, 73/147, 115, 866.5, 756, 431

[56] References Cited

U.S. PATENT DOCUMENTS

| | | | |
|---|---|---|---|
| 4,361,315 | 11/1982 | Kajihara et al. | 73/866.5 |
| 4,783,994 | 11/1988 | Ashby, Jr. | 73/147 |
| 4,829,836 | 5/1989 | Daverio et al. | 73/866.5 |

Primary Examiner—Donald O. Woodiel
Attorney, Agent, or Firm—Kevin B. Osborne

[57] ABSTRACT

An improved static pressure probe containing a water cooling mechanism. This probe has a hollow interior containing a central coolant tube and multiple individual pressure measurement tubes connected to holes placed on the exterior. Coolant from the central tube symmetrically immerses the interior of the probe, allowing it to sustain high temperature, in the region of 2500° F., supersonic jet flow indefinitely, while still recording accurate pressure data. The coolant exits the probe body by way of a reservoir attached to the aft of the probe. The pressure measurement tubes are joined to a single, larger manifold in the reservoir. This manifold is attached to a pressure transducer that records the average static pressure.

10 Claims, 5 Drawing Sheets

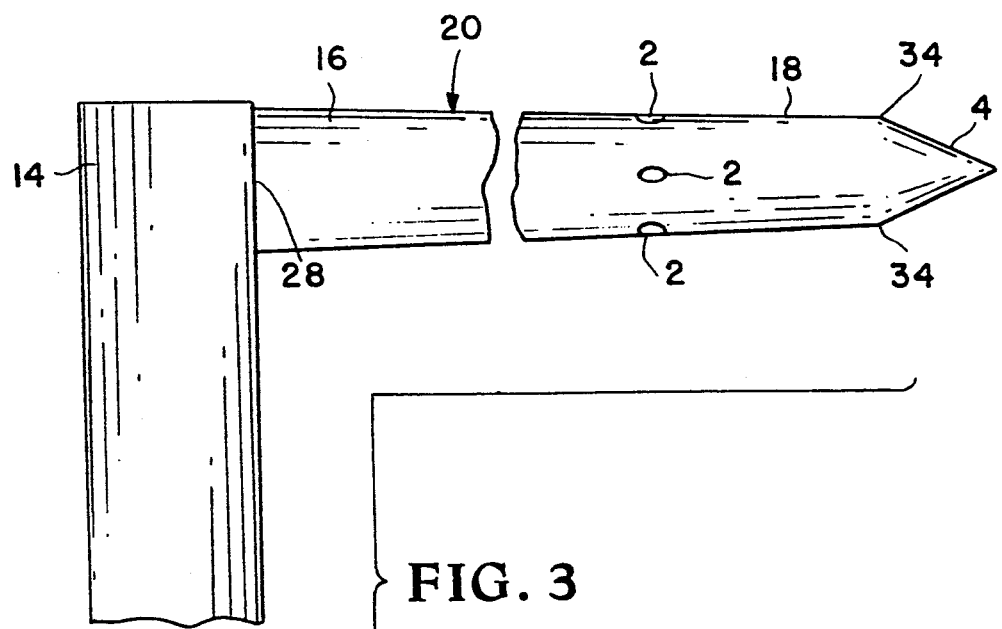
FIG. 3
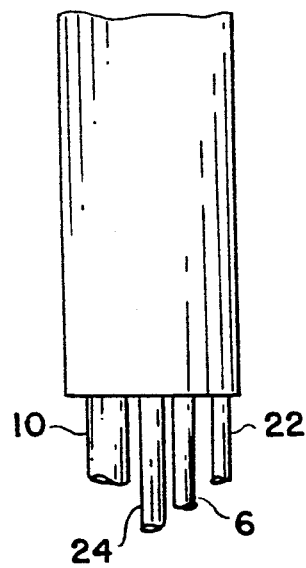
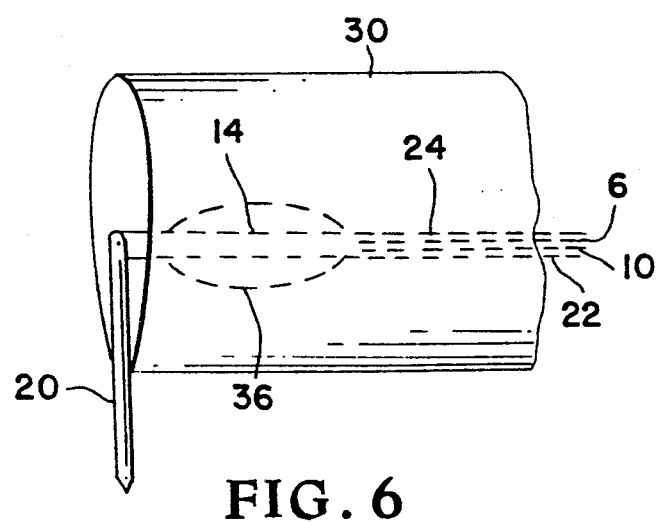
FIG. 5
FIG. 6

WATER COOLED STATIC PRESSURE PROBE

Origin of the Invention

The invention described herein was made jointly in the performance of work under NASA Grant NO. NCC1-14 with George Washington University and employees of the United States Government. In accordance with 35 U.S.C. 202, the grantee elected not to retain title.

BACKGROUND OF THE INVENTION

1. Technical field of the Invention

This invention relates generally to an apparatus for measurement of static pressure and specifically to an improved static pressure measurement probe for use in high temperature supersonic flows.

2. Description of Prior Art

Supersonic static pressure probes have been used for decades in supersonic and hypersonic wind tunnels and on aircraft. However, there have been no probes that have been able to endure an indefinite period of time in a high temperature (2000° F.) flow and still return accurate data.

Water cooled static pressure probes are in use in high temperature environments, but their flow exposure period is limited to a few seconds.

Pinckney (U.S. Pat. No. 3,914,997) disclosed a probe containing exterior cone angles similar to the present invention. However, the Pinckney probe contained no cooling mechanism, as it was designed for ambient temperature flow, and no longer records accurate data at temperatures above 900° F. As well, Pinckney only used one central tube to record the static pressure, while this invention uses four, and the location and size of the pressure ports are different than those used by Pinckney.

SUMMARY OF THE INVENTION

An object of the present invention is to provide a new and improved static pressure probe for use in high temperature supersonic wind tunnel testing.

Another object of the invention is to provide for a static pressure probe that can indefinitely withstand exposure to high temperatures and supersonic velocities in wind tunnel testing.

According to the present invention, the foregoing and other objects are attained by providing a static pressure probe whose exterior consists of two sections, the aft section and the forward section (probe tip). The probe utilizes an annular cooling method. A single center tube, proceeding up to the backside of the tip, provides coolant water to the probe. The water sprays the back of the tip, and symmetrically immerses the region between the inlet water tube and the inner wall of the probe as it proceeds to the aft of the probe. Four tubes inside the probe serve to read the static pressure. The four tubes are connected to four independent probe pressure ports that are 90 degrees apart, and surround the inlet water tube. The four pressure tubes are joined to a single, larger tube, which is connected to a pressure transducer that determines the static pressure. The coolant water exits the probe by way of a reservoir attached to the aft of the probe.

Brief Description of the Drawings

FIG. 3 is a side view of the exterior of the probe;

FIG. 5 is a side view of the probe as used in testing;

FIG. 6 is a vertical view of the probe as used in testing;

Description of the Preferred Embodiments

Figure 1:
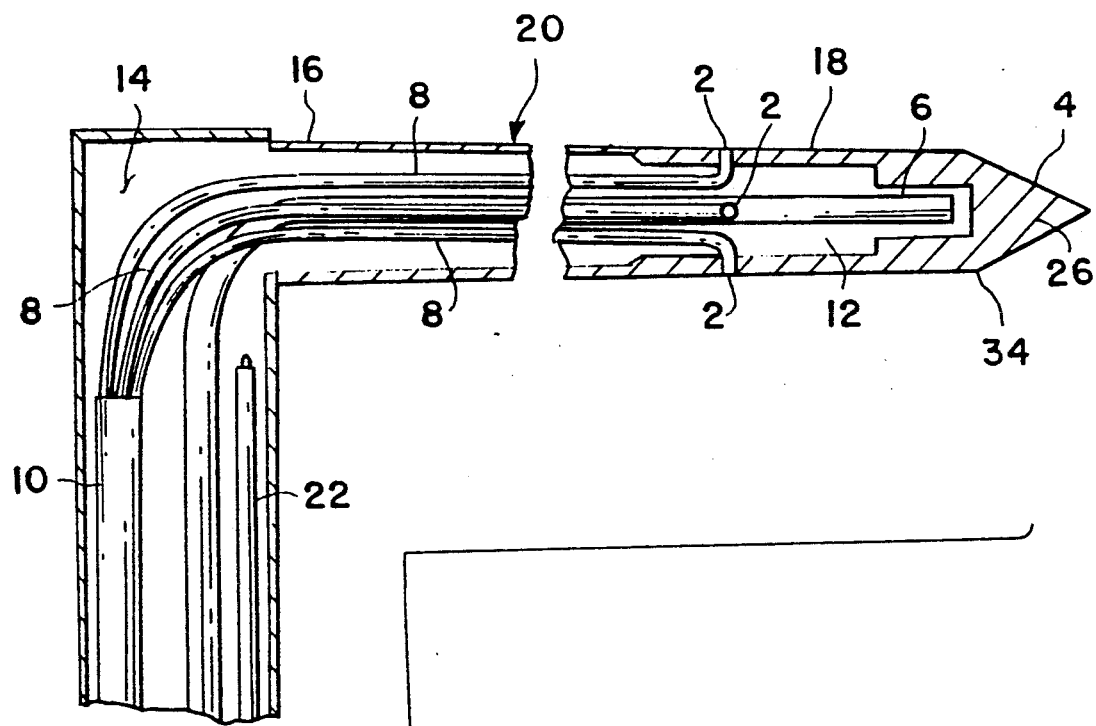
FIG. 1 is an enlarged schematic view of the static pressure probe.

Referring now to the drawings, FIG. 1 depicts an enlarged schematic view of static pressure probe 20. Probe tip 18 of static pressure probe 20 contains four probe pressure ports 2 that are 90 degrees apart. Four independent pressure tubes 8 are connected to probe pressure ports 2, surrounding inlet water tube 6. Pressure tubes 8 extend through aft end 16 of static pressure probe 20 and into reservoir 14, where they are jumped into a single, larger main pressure tube 10. Water ejected from inlet water tube 6 sprays the backside of conic curve section 4 and washes through interior coolant chamber 12 of static pressure probe 20 into reservoir 14. The water leaves reservoir 14 by way of water outlet tube 24. Reservoir 14 also contains thermocouple 22 which measures the exit water temperature.

Figure 2:
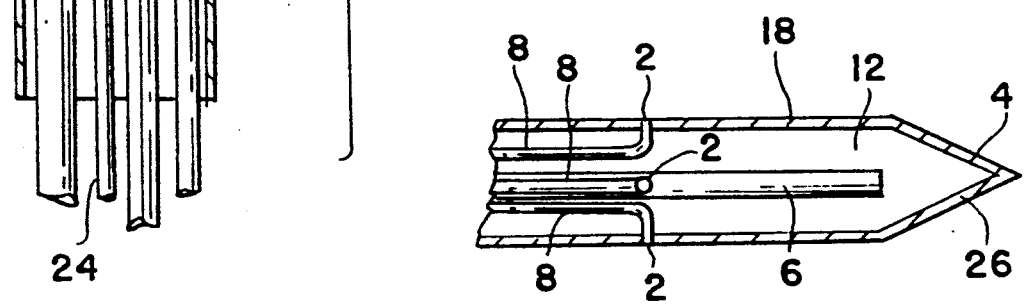
FIG. 2 demonstrates an alternate embodiment of the probe tip shown in FIG. 1.

FIG. 2 depicts an alternate embodiment of the probe tip 18 shown in FIG. 1. In FIG. 1, interior shell 26 of probe tip 18 is constructed of graduated widths, leading to a solid conic curve section 4. Interior shell 26 can be of a uniform thickness, with an open conic curve section 4, as demonstrated in FIG. 2, for maximum cooling area.

FIG. 3 demonstrates the outer appearance of static pressure probe 20 shown in FIG. 1. Probe tip 18 contains four probe pressure ports on an otherwise smooth exterior. Probe tip 18 also gradually decreases in diameter until it reaches corner 34 and proceeds to a sharp point in conic curve section 4. Aft end 16 is welded or otherwise attached to reservoir 14 at joint 28. Water inlet tube 6, water outlet tube 24, thermocouple 22, and main pressure tube 10 all extend out of the bottom of reservoir 14.

Figure 4:
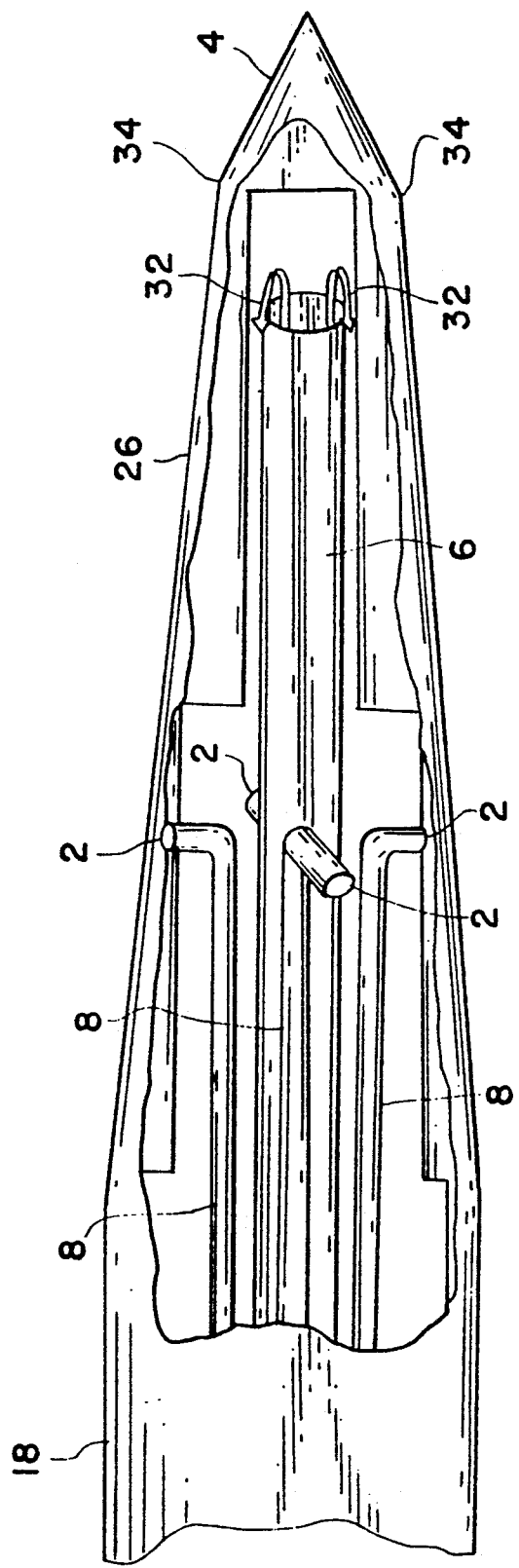
FIG. 4 is a three dimensional cut-away view of the probe tip shown in FIG. 1.

FIG. 4 is a three-dimensional cut-away view of probe tip 18 shown in FIG. 1. The relative placements of pressure tubes 8 and water inlet tube 6 are demonstrated. Arrows 32 indicate the direction of the water ejected from water inlet tube 6.

The exterior cone angles of probe tip 18 are similar to that of Pinckney, U.S. Pat. No. 3,914,997, and need not be disclosed any further. Pinckney described a small but accurate probe that reads static pressure through strategically placed pressure probe ports on its tip.

In the present invention, when static pressure probe 20 is placed in a supersonic flow with total temperatures up to approximately 2500° F., ambient (room) temperature water is injected through inlet water tube 6 into coolant chamber 12 of probe tip 18. As the water is forced through coolant chamber 12 towards reservoir 14 by pressure from entering water, it symmetrically washes over pressure tubes 8 and against interior shell 26 due to the placement of water inlet tube 6 in the center of body 12. This annular cooling method lowers the temperature of static pressure probe 20 sufficiently to allow the probe to remain in a high temperature flow for an indefinite length of time. After the water is forced into reservoir 14, the water pressure forces it out of reservoir 14 through water outlet tube 24. By increasing the mass flow rate of the water and/or decreasing the temperature of the water, the temperatures that static pressure probe 20 can withstand are increased. Because of the high mass flow rate and turbulent nature of the water flow, pressure tubes 8 have a tendency to become misaligned, and no longer remain 90 degrees apart. In order to have pressure tubes 8 retain their symmetry for the most efficient possible cooling, pressure tubes 8 can be welded at the desired position to water inlet tube 6 without any loss to accuracy or cooling properties.

As cooling is being accomplished by the forcing of ambient temperature water through body 12, static pressure probe 20 also measures the static pressure. Air enters pressure tubes 8 through probe pressure ports 2. In reservoir 14, pressure tubes 8 are jumped to a single main pressure tube 10, a manifold. Main pressure tube 10 is attached to a strain gauge pressure transducer, or any other pressure measuring device. The pressure transducer will measure the average static pressure of the air entering the four probe pressure ports 2. In another embodiment of the present invention, each individual pressure tube 8 is attached to a pressure transducer. When this occurs, the need for main pressure tube 10 is eliminated. As well, while the invention is described with four probe pressure ports 2 and four pressure tubes 8, it can be designed with more or less probe pressure ports 2 as long as an individual pressure tube 8 is attached to each probe pressure port 2.

Reservoir 14 also contains optional thermocouple 22. This thermocouple 22 measures exit water temperature in order to determine when steady state cooling has been achieved. Stabilization of the exit water temperature indicates that static pressure probe 20 can maintain its presence in the high temperature airflow indefinitely, without overheating the probe. However, the absence of this thermocouple 22 does not prevent the invention from working.

Any coolant, such as liquid mercury, freon, antifreeze, or liquid nitrogen can be used in place of water. Water is the preferred coolant, though, because it is the most inexpensive and readily available coolant, and because there would be no contamination of the test environment if static pressure probe 20 ruptured during use. Similarly, the water can be cooler or warmer than room temperature, as long as the appropriate cooling is achieved. However, room temperature water is the least expensive for use.

Reservoir 14 is not limited in shape to the cylindrical form demonstrated in FIGS. 1 and 6. Instead, reservoir 14 can be any size and shape. In FIG. 6, for example, reservoir 14 can be shaped to fit the inside of wing 30 exactly, in an alternate embodiment of the invention. This is beneficial because reservoir 14 then acts to cool wing 30 as well as static pressure probe 20. Additionally, in a further embodiment of the invention, reservoir 14 is eliminated from static pressure probe 20. In this case, exit water simply through a single water exit tube such as water outlet tube 24, without any encasement of pressure tubes 8, water inlet tube 6, or water outlet tube 24. There must be a water exit tube to maintain the pressure inside coolant chamber 12. Otherwise, the water will vaporize inside of coolant chamber 12 and exposure of static pressure probe 20 to high temperatures will result in insufficient cooling.

Static pressure probe 20 can be made in many sizes, depending on what is desired to be tested. One feature of this invention is the small size that can be achieved. For small diameter jet flows, it can be scaled down to a small enough size to avoid interference with the jet flow. Larger probes may change the characteristics of the jet plume, making their use impractical.

EXAMPLES

EXAMPLE 1

A small scale static pressure probe 20 was fabricated in order to determine the static pressure properties of high-temperature supersonic jets. The outer body of static pressure probe 20 was composed of two parts. Aft end 16 was a 0.1875 in. outer diameter and 0.1563 in. inner diameter by 2.456 in. long tube, with a 0.156 in. by 0.094 in. shoulder on one end. Probe tip 18 was fabricated from a 0.1875 in. diameter by 1.250 in. long AISI-347 stainless steel solid bar stock. One end was counter bored 0.157 in. by 0.094 in. to accept the shoulder of aft end 16. Conic curve tip 4 had a 20 degree conical angle and was 0.164 in. long. The outer body of static pressure probe 20 blended into a 2.0 degree tapered angle that ended 1.136 in. from the tip. Probe tip 18 was drilled up to 0.1563 in. from the tip. It had four 0.020 in. outer diameter and 0.010 in. inner diameter probe pressure ports 2, perpendicular to the probe centerline, that were spaced 90 degrees apart from each other and 0.935 in. from the tip. The four 0.020 in. pressure tubes 8 were 2.500 in. long and were bent to form 90 degree corners at the end. These pressure tubes 8 were inserted into the probe body and crimped to remain in place. A 0.060 in. outer diameter tube was inserted into the probe body to hold pressure tube 8 ends against the wall of the probe body. Pressure tubes 8 were brazed with Lucas-Milhaupt 750 (1400° F.) alloy. The 0.060 in. tube was removed and the body was flushed to remove all the flux. The 0.060 in. outer diameter and 0.040 in. inner diameter by 4.00 in. long tube was inserted into the probe body, up to 0.335 in. of the tip to act as inlet water tube 6. Pressure tubes 8 were spot welded to inlet water tube 6 to hold the assembly in place.

Aft end 16 was brazed to probe tip 18. The exposed portions of pressure tubes 8 were filed flush with the probe body and were cleaned with a 0.010 in. drill. All four pressure tubes 8 were bent toward each other and around inlet water tube 6 in a "goose neck" fashion to form a junction. The four pressure tubes 8 were inserted, and brazed, into a 4.00 in. long by 0.090 in. diameter tube acting as main pressure tube 10. This and inlet water tube 6 were bent 90 degrees with a 0.500 in. radius starting 3.00 in. from the front face of static pressure probe 20.

Reservoir 14 was composed of three parts. The outer case was 0.500 in. outer diameter by 4.750 in. long tubing with a 0.3125 diameter slot, 0.320 in deep, perpendicular to the centerline of the outer case. The top cap was fabricated from AISI-347 stainless steel bar stock and was 0.500 in. in diameter. It was 0.125 in. thick. The 0.500 in outside diameter was turned down to 0.430 in. for the 0.060 in. length. The bottom cap was fabricated to the same specifications as the top cap, except that it was drilled to accept three 0.125 in. diameter tubes. The 0.125 in. holes provided a means of installing the inlet water tube 6 and water outlet tube 24. The 0.060 in. holes accepted a 0.0603 in. Type K chromel-alumel sheathed thermocouple 22, with an exposed head. Thermocouple 22 was inserted 3.00 in. into reservoir 14 and monitored the temperature of the exit water. See FIG. 1.

Figure 7:
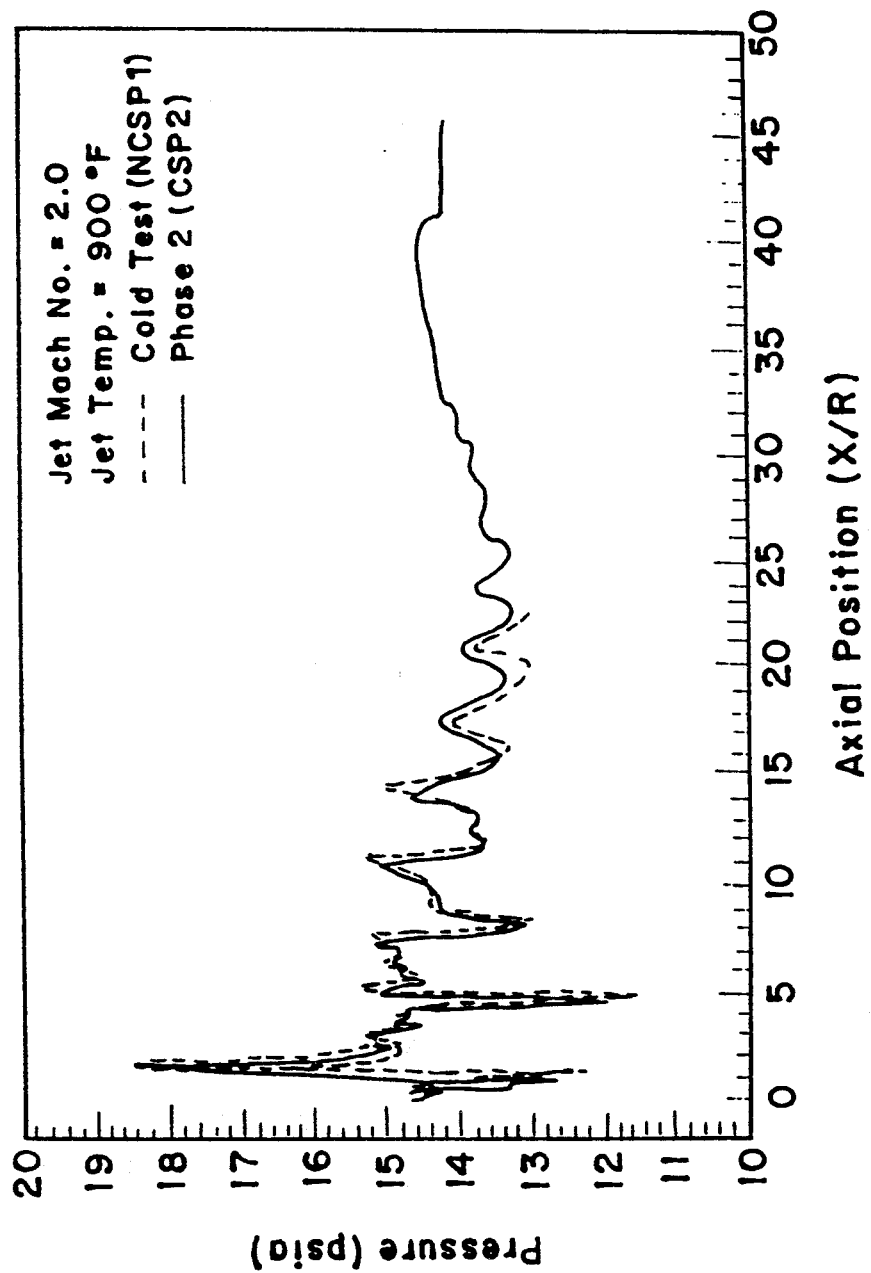
FIG. 7 is a graphical illustration of the accuracy of the static pressure determined by the probe.

In the experimental setup, this static pressure probe 20 was supported by supersonic water cooled supporting wing 30, as shown in FIGS. 5 and 6. The probe was placed along the jet centerline in a 900° F. airflow caused by a simulated jet exit plume at 2.0 mach for over 45 minutes. The data taken from the probe was compared to that of a uncooled static pressure probe (conforming to Pinckney, U.S. Pat. No. 3,914,997). The results show that the water cooled probe readings were consistent with the uncooled readings, with the offset in the data attributed either to a misalignment of the traverse rig used to position the probe or the locating of the pressure ports further back from the tip than ports placed on the uncooled probe. See FIG. 7, which graphically illustrates the measurements of pressure as a function of the axial position. The axial position is a non dimensional unit that equals centerline distance of the probe from the jet nozzle/radius of the jet nozzle.

EXAMPLE 2

Figure 8:
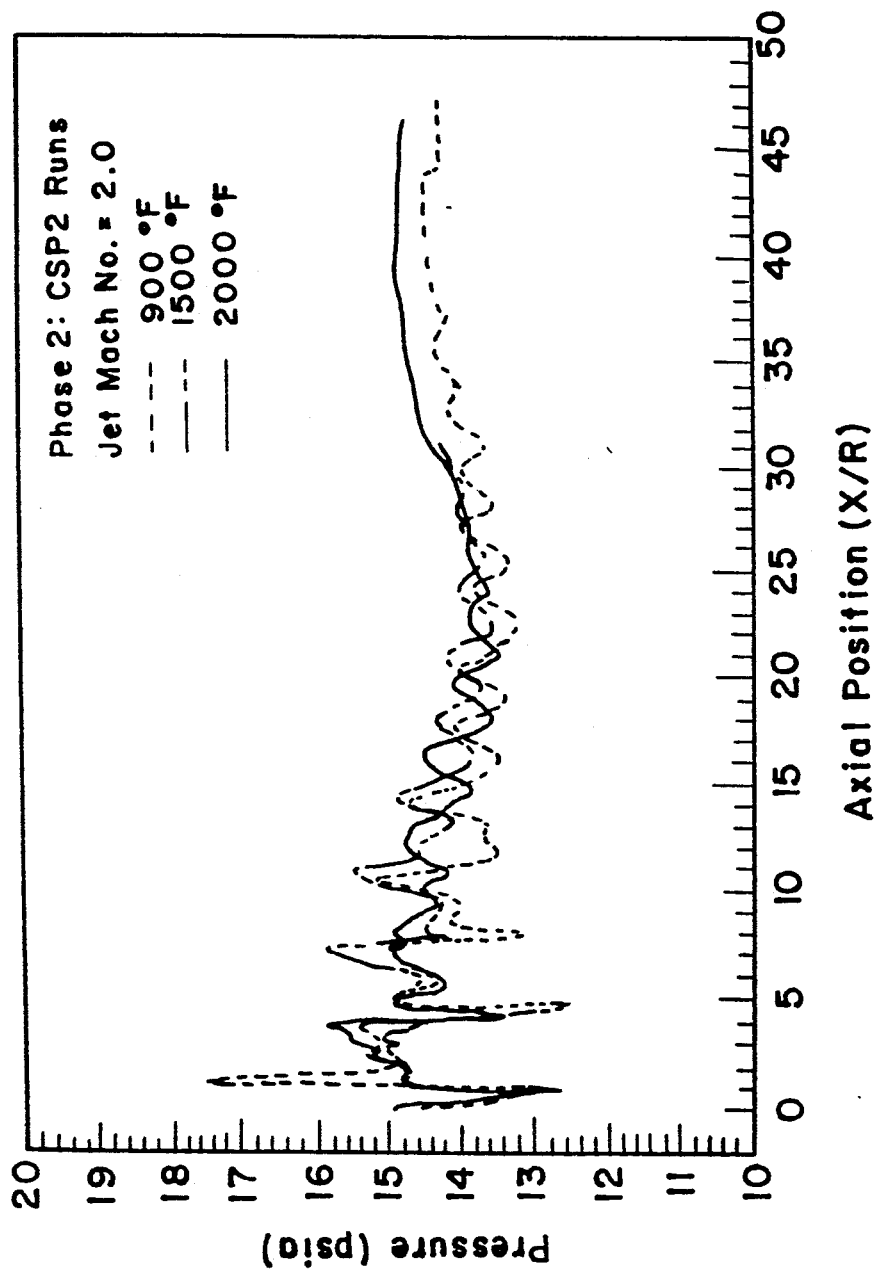
FIG. 8 is a graphical illustration of the static pressure determined by the probe at different temperatures.

The static pressure probe 20 from Example 1 was placed along the jet centerline of airflow with a jet exit stagnation temperature of 1500° F. Temperature readings from thermocouple 22 indicated that the exit water temperature reached steady state after 5 seconds, signifying that static pressure probe 20 was at equilibrium and could withstand indefinite exposure at this temperature without a failure. Static pressure probe 20 remained in the airflow for 45 minutes with no problems. Infrared pictures of static pressure probe 20 did not detect the presence of static pressure probe 20 after 10 minutes in the airflow, indicating that it was being cooled adequately and contained no hot spots to be caught by the camera. Static pressure recordings from static pressure probe 20 remained accurate. See FIG. 8. Pressure readings as a function of axial position showed the same positioning of peaks and valleys as recorded by the probe at 900° F. when static pressure probe 20 was close to the jet nozzle, as would be expected if the readings were accurate.

EXAMPLE 3

Static pressure probe 20 from Example 1 was placed along the jet centerline of airflow having a jet stagnation exit temperature of 2000° F. The exit water temperature stabilized after 5 seconds, as in Example 2. Infrared pictures of static pressure probe 20 after 15 seconds detect negligible local heating at the tip, which was not completely cooled because of the thickness of interior shell 26 at that point. However, this was not a point of weakness on static pressure probe 20, and it could comfortably withstand the 2000° F. temperature indefinitely. Static pressure probe 20 also remained accurate at this high temperature. See FIG. 8. The readings from this experiment line up with the other readings near the jet nozzle as expected from an accurate recording.

Static pressure probe 20 remained in the airflow for only 35 seconds because of damage sustained by supporting wing 30, which limited the amount of time that supporting wing 30 could be exposed to flow. This short exposure time was not due to any limitation of static pressure probe 20, however.

In studying damaged supporting wing 30, it became clear that reservoir 14 for static pressure probe 20 could also be used to cool supporting wing 30 itself. The area in supporting wing 30 surrounding static pressure probe 20 did not suffer the heat damage of the unprotected area. See FIG. 6. Area 36 surrounding reservoir 14 is protected by a reservoir of this size.

Although the invention has been described relative to a specific embodiment thereof, it is not so limited and many modifications and variations thereof will be readily apparent to one skilled in the art in light of the above teachings. It is therefore to be understood that within the scope of the applied claims the invention may be practiced otherwise than as specifically claimed.

What is claimed as new and desired to be secured by Letters Patent of the United States is:

1. In combination with a static pressure probe of the type including a cylindrically shaped probe containing a conic tip, whereby at supersonic speeds the static pressure along the surface of said probe is approximately that of free stream static pressure at a plurality of spaced holes placed on selected points of said probe;
 the improvement which comprises:
 (1) a plurality of individual pressure tubes running from said holes internally of said probe;
 (2) a tube for cooling the interior of said cylindrical probe and said pressure tubes therein;
 (3) means to remove coolant from said interior of said cylindrical probe, such that the pressure of said interior remains sufficient to maintain said coolant in a liquid state; and
 (4) means connected to said pressure tubes for measuring the static pressure at said holes.

2. The apparatus of claim 1, wherein coolant ejected from said cooling tube will symmetrically spray the interior of said probe and said pressure tubes.

3. The apparatus of claim 2, wherein the means for removing said coolant from said interior of said coolant probe consist essentially of a reservoir attached to said probe, such that said coolant ejected from said cooling tube will collect in said reservoir.

4. The apparatus of claim 3, wherein said plurality of holes comprises four holes placed 90 degrees apart encircling the surface of said probe.

5. The apparatus of claim 4, wherein said coolant is water.

6. The apparatus of claim 4, additionally comprising a means of measuring the temperature of the coolant contained in said reservoir.

7. The apparatus of claim 6, wherein the means of measuring the temperature of the coolant in said reservoir is a thermocouple.

8. The apparatus of claim 4, in which said individual pressure tubes are combined into a manifold in said reservoir.

9. The apparatus of claim 8, wherein said manifold is attached to strain gauge pressure transducer, whereby the average static pressure on the surface of the probe is measured.

10. The apparatus of claim 4, additionally comprising a means of removing said coolant from said reservoir.

* * * * *